United States Patent [19]

Gederos

[11] 4,135,751
[45] Jan. 23, 1979

[54] RAZOR CLAM SHOVEL

[76] Inventor: Wayne L. Gederos, P.O. Box 611, Coos Bay, Oreg. 97420

[21] Appl. No.: 838,139

[22] Filed: Sep. 30, 1977

Related U.S. Application Data

[63] Continuation-in-part of Ser. No. 725,890, Sep. 23, 1976, abandoned.

[51] Int. Cl.² ............ A01B 1/02; A01D 11/00
[52] U.S. Cl. .................... 294/49; 294/55.5
[58] Field of Search ........ 294/49, 50, 50.6, 51, 294/55, 55.5; 37/55, 119; 56/327 R; 209/417, 418, 419

[56] References Cited

U.S. PATENT DOCUMENTS

| | | | |
|---|---|---|---|
| 126,465 | 5/1872 | Lake et al. | 294/55.5 |
| 571,205 | 11/1896 | Sorenson | 294/55.5 |
| 1,135,820 | 4/1915 | Korteum et al. | 209/419 |
| 1,336,203 | 4/1920 | Crago | 294/55.5 |
| 1,621,715 | 3/1927 | Eckley | 294/55.5 |
| 2,035,799 | 3/1936 | Dippel | 37/119 |
| 2,987,836 | 6/1961 | Carlbom | 294/50.6 X |
| 3,095,228 | 6/1963 | Duppengiesser | 294/49 |
| 3,226,149 | 12/1965 | McJohnson | 294/49 X |
| 3,372,496 | 3/1968 | Lawlis | 37/119 |

Primary Examiner—Johnny D. Cherry
Attorney, Agent, or Firm—Klarquist, Sparkman, Campbell, Leigh, Hall & Whinston

[57] ABSTRACT

An improved clam shovel for digging razor clams includes a dished shovel blade attached to the lower end of a shovel shaft having a handle at its opposite end. The upper side of the shovel blade is transversely and longitudinally concave. The blade is longitudinally slotted inwardly from the center of its free cutting edge to about mid-length to define a pair of broad laterally spaced tines. The slot tapers inwardly from the blade cutting edge so that its inner closed end is narrower than its outer open end and so that the slot resembles a wedge blocked off and rounded at its narrow end.

2 Claims, 4 Drawing Figures

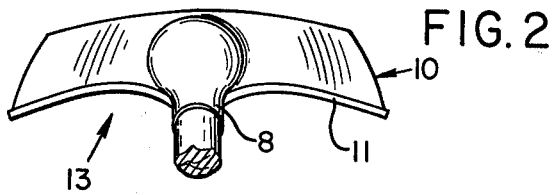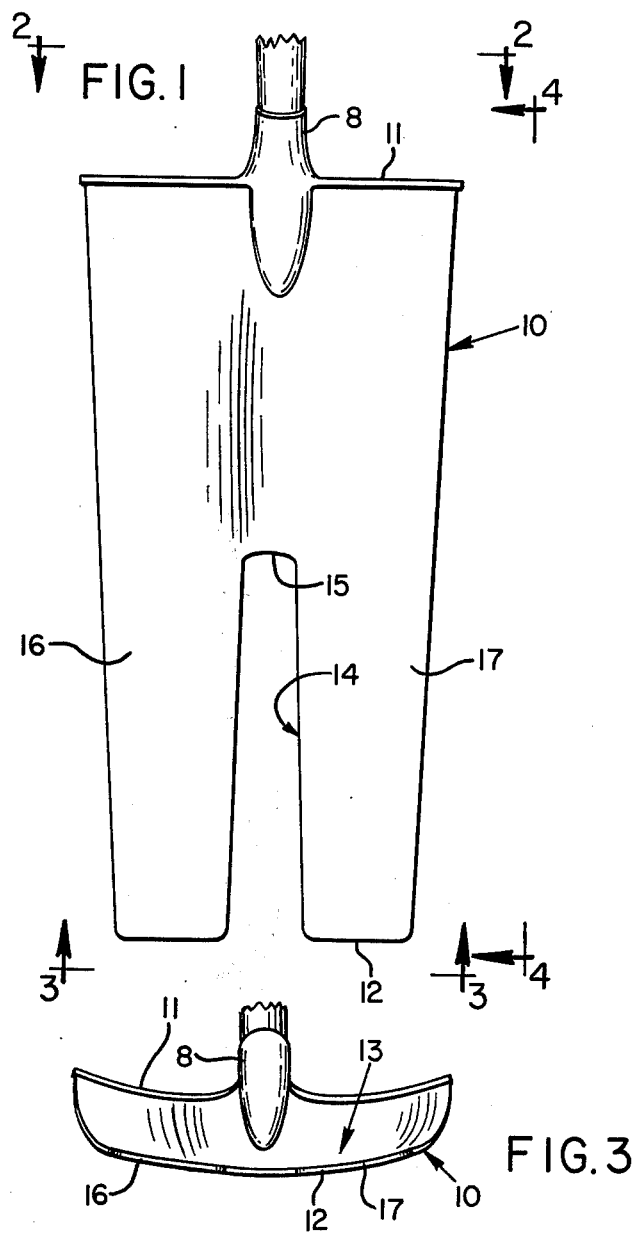

RAZOR CLAM SHOVEL

RELATED APPLICATION

This application is a continuation in part of pending application Ser. No. 725,890, filed Sept. 23, 1976, now abandoned.

BACKGROUND OF THE INVENTION

1. Field of the Invention

The present invention relates to an improved clam shovel especially suited for digging razor clams in the surf.

2. Description of the Prior Art

In digging razor clams, only large clams of legal size may be kept. The smaller clams must be released. Conventional clam shovels used for digging razor clams have long, narrow blades which extend continuously from side to side and end to end of the blade throughout its length, somewhat similar to a small garden spade. In digging razor clams in the surf, the blade of such a shovel is inserted into the sand seaward of the clam in the surf. As soon as the blade penetrates the sand beneath the surf, water readily soaks into the compacted sand and loosens it. When the clam is dislodged, it quickly tries to escape, as it would, unless the clam digger stoops down and grasps the clam with one hand or places one foot over it to press it against the shovel blade until the clam is brought up and out of the water. This is a difficult procedure for anyone, and as a result frequently the clam escapes. However, the described clam-digging procedure with a conventional clam shovel is even more difficult for those of us who are physically handicapped and who cannot stoop or who must keep both hands on the shovel handle and both feet on the sand for balance.

Other clam-digging devices have been suggested, such as those shown in U.S. Pat. Nos. 1,336,203; 2,035,799; and 2,987,836. However, all such prior devices are of a complex, expensive construction and are difficult to use. Moreover, they could nto be easily and successfully used for digging and retaining only razor-clams of legal size in the surf, and do not overcome the aforementioned difficulties in digging razor clams.

Various forked digging or spading tools have been suggested as shown, for example, in U.S. Pat. Nos. 126,465; 1,135,820; 1,621,715; and 3,095,228. Even if such devices were used to dig razor clams in the surf, which is not suggested by such patents, the devices do not have forked blades of a nature which would capture only legal-sized clams while allowing under-sized clams to escape and would not necessarily retain a razor clam on their blades without use of the digger's hands or feet.

Accordingly, there is a need for a simple, easy-to-use clam-digging shovel suitable for digging razor clams in the surf and having a blade that will capture and retain clams of legal size while permitting undersized clams to escape, all without the use of the hands or feet of the digger in conjunction with the blade.

SUMMARY OF THE INVENTION

A primary object of the invention is to provide an improved shovel for digging razor clams in the surf.

Another primary object is to provide a clam shovel as aforesaid which, when properly used, retains only clams of legal size while enabling undersized clams to escape without injury.

Another primary object is to provide a clam shovel as aforesaid which will retain a clam of legal size on its blade without physical assistance from the digger.

Another primary object is to provide a clam shovel as aforesaid which utilizes the hydraulic pressure of the water and fluidized sand to help retain a captured clam on the shovel blade.

Another important object of the invention is to provide a clam shovel as aforesaid which is of simple and economical construction.

Still another important object is to provide a clam shovel as aforesaid which is easy and effective to use.

The foregoing objects are achieved according to the present invention by providing a clam shovel with a longitudinally and laterally dished blade characterized by a central tapered slot extending longitudinally inwardly from the center of the cutting edge of the blade to about its mid-length, with the slot becoming progressively narrower from its open end to its closed end. The slot is sized, tapered, and shaped so as to increase the possibility of trapping a razor clam between the blade tines, particularly if the clam is down deep in the sand below the surf. The possibility of so trapping a clamp is remote with ordinary shovels of the prior art having forked blades with straight openings between the forks.

The shape and size of the tapered slot is such that when the blade is inserted in the proper location in the sand beneath the surf and the shovel handle pushed downwardly to force the blade upwardly toward the horizontal, and then lifted, the razor clam is brought against the dished side of the blade and raised up through the surf on it. If the clam is undersized, it will escape through the slot without injury to its shell. The water surging over and around the clam and out through the slot as the shovel blade is quickly brought up and out of the water, holds a larger razor clam of legal size on the blade. The clam is forced by water pressure into the blade depression at the small end of the slot where it lies immobilized. The decreased size of the slot opening at this point also provides more bottom area to the dish of the blade, giving the shovel more trough and scoop effect in directing the flow against the clam. The force of the water and fluidized sand flowing over and around the clam, then out through the wider slot below it, creates the necessary pressure to hold the clam on the shovel without assistance from the digger.

The foregoing and other objects, features, and advantages of the present invention will become more apparent from the following detailed description which proceeds with reference to the accompanying drawings.

BRIEF DESCRIPTION OF THE DRAWINGS

In the drawings:

FIG. 1 is a front view of a blade and short lower handle portion of a clam shovel of the present invention;

FIG. 2 is a sectional view taken along the line 2—2 of FIG. 1;

FIG. 3 is an end view of the blade portion of the shovel as viewed from the line 3—3 of FIG. 1; and FIG. 4 is a side view of the shovel blade and lower handle portion as viewed from line 4—4 of FIG. 1.

DETAILED DESCRIPTION OF A PREFERRED EMBODIMENT

Referring to the drawing, my improved razor clam shovel includes a shaft 8 which extends from a typical shovel handle (not shown) at one end to a shovel blade 10 at its opposite end. Shaft 8 is rigidly attached to blade 10 at a central rear edge portion 11 of the blade. The blade itself is relatively long and narrow and tapers progressively inwardly from its straight rear or upper edge 11 to its leading or lower cutting edge 12. Moreover, the blade is symmetrically transversely dished about its longitudinal axis so that an upper side of the blade, indicated at 13 in FIGS. 2 and 3, is transversely concave. The blade is also dished longitudinally from its rear edge 11 in a direction toward its front cutting edge 12, as will be apparent from FIG. 4. However, the dishing effect in the longitudinal direction ends in the midportion of the blade, with the blade being substantially straight from there to its cutting edge, also as shown in FIG. 4.

A tapered slot 14 extends inwardly from a central portion of cutting edge 12 longitudinally of the blade, terminating at approximately the mid-length of the blade at a rounded and closed slot end portion 15. The slot is widest at its open end and becomes progressively narrower so as to be narrowest at its closed end 15 as shown best in FIG. 1. Slot 14 defines a pair of broad, laterally spaced tines or blade portions 16, 17 extending rearwardly from the cutting edge 12 and laterally spaced apart by the slot. The size and degree of taper of slot 12 may be varied to suit the type and size of clams being dug and the regulations in effect where the clams are to be dug.

Example

The following blade dimensions have been found to be suitable for a clam shovel for digging razor clams in the surf: The overall length and width of the blade can be varied within wide limits, depending on the preference of the user. However, typically such blade is approximately 10 inches long and 5 inches wide at rear edge 11, tapering to 4 inches wide at cutting edge 12. The maximum depth of the dish or depression just behind the closed end 15 of slot 14 is at least about ⅞ inch. The slot itself is 5 inches in length and 1 inch wide at its open end, tapering to ¾ inch wide at its closed end.

A clam shovel as described is most easily manufactured by forming the shaft, handle and a continuous blade in a conventional manner and joining the handle to one end of the shaft and the blade to the other end by conventional means. A conventional razor clam blade can be used and then the slot stamped or cut from the one-piece continuous blade.

Operation

To dig razor clams in the surf using my shovel as described, the blade with its dished side facing the clam is inserted into the sand generally vertically on the seaward side of the clam, applying downward pressure to the handle and foot pressure to the rear edge 11 of the blade if necessary. As the blade sinks into the compacted sand, water entering the sand readily loosens it and dislodges the clam. With both hands remaining on the shovel handle, the blade is forced rearwardly and upwardly in the direction of arrows 20 in FIG. 4 through leverage applied to shaft 8 at the handle. The blade is quickly lifted from the sand and through the surf to force the razor clam against the upper dished side of the shovel blade and lift the clam with the blade up through the surf. If the clam is undersized, it will escape through slot 14 without injury to its shell. This feature helps preserve the clam population and ensure growth of the species.

As the blade is lifted rapidly from the surf, the water and fluidized sand surging over and around the clam on the blade and out through the slot hold a large razor clam in the dished depression against the upper surface of the blade. Its locomotive power is thus lost, and it lies immobilized in the depression at the small end of the slot opening on the blade. The decreased size of the slot opening at this point also provides more bottom area to the dish, giving the shovel more trough and scoop effect in directing the flow against the clam. The force of the water flowing over and around the clam, then out through the wider slot below it, creates the pressure needed to hold the clam on the shovel.

The outstanding results of this improvement, coupled with the simplicity of its manufacture and construction, make my improved clam shovel the most practical implement for use in digging razor clams in the surf.

Having illustrated and described the principles of my invention by what is presently a preferred embodiment thereof, it will be apparent to those persons skilled in the art that the same may be modified in arrangement and detail without departing from such principles. I claim as my invention such embodiment and all modifications thereof coming within the true spirit and scope of the following claims.

I claim:

1. A clam shovel for digging clams in the surf comprising:
   a shovel blade having front and rear faces, a rear edge joined to a shovel shaft and an opposite free cutting edge;
   a single tapered slot extending inwardly longitudinally of said blade from an open end at a central portion of said cutting edge to a closed end terminating at a midportion of said blade;
   said slot being wider at said open end than at said closed end;
   said blade being laterally and longitudinally dished to provide a depression in said front face, with the maximum depth of said depression being in the vicinity of the closed end of said slot, and with said depression including both slotted and unslotted blade portions radiating from said vicinity;
   said unslotted blade portion rearwardly of the closed end of said slot having a length dimension at least substantially as great as the length dimension of the slotted portion of said blade and having a maximum width dimension exceeding the maximum width dimension of the slotted portion of said blade;
   the maximum width of said slot at said closed end selected so as to retain a legal sized clam in said blade depression in a portion overlying said closed end portion of said slot,
   whereby in digging a razor clam in the surf a legal sized razor clam can be lifted from the sand through the surf on said depression by the pressure of water and fluidized sand flowing against and around the clam and out through said slot as the blade is lifted upwardly through the surf in a generally horizontal attitude.

2. A clam shovel according to claim 1 wherein said slot has a length of about five inches, a width of at least about one inch at said open end, and a width of about three-quarters of an inch at said closed end, and wherein the maximum depth of the dished depression is at least three-quarters of an inch.

* * * * *